United States Patent Office 3,110,832
Patented Nov. 12, 1963

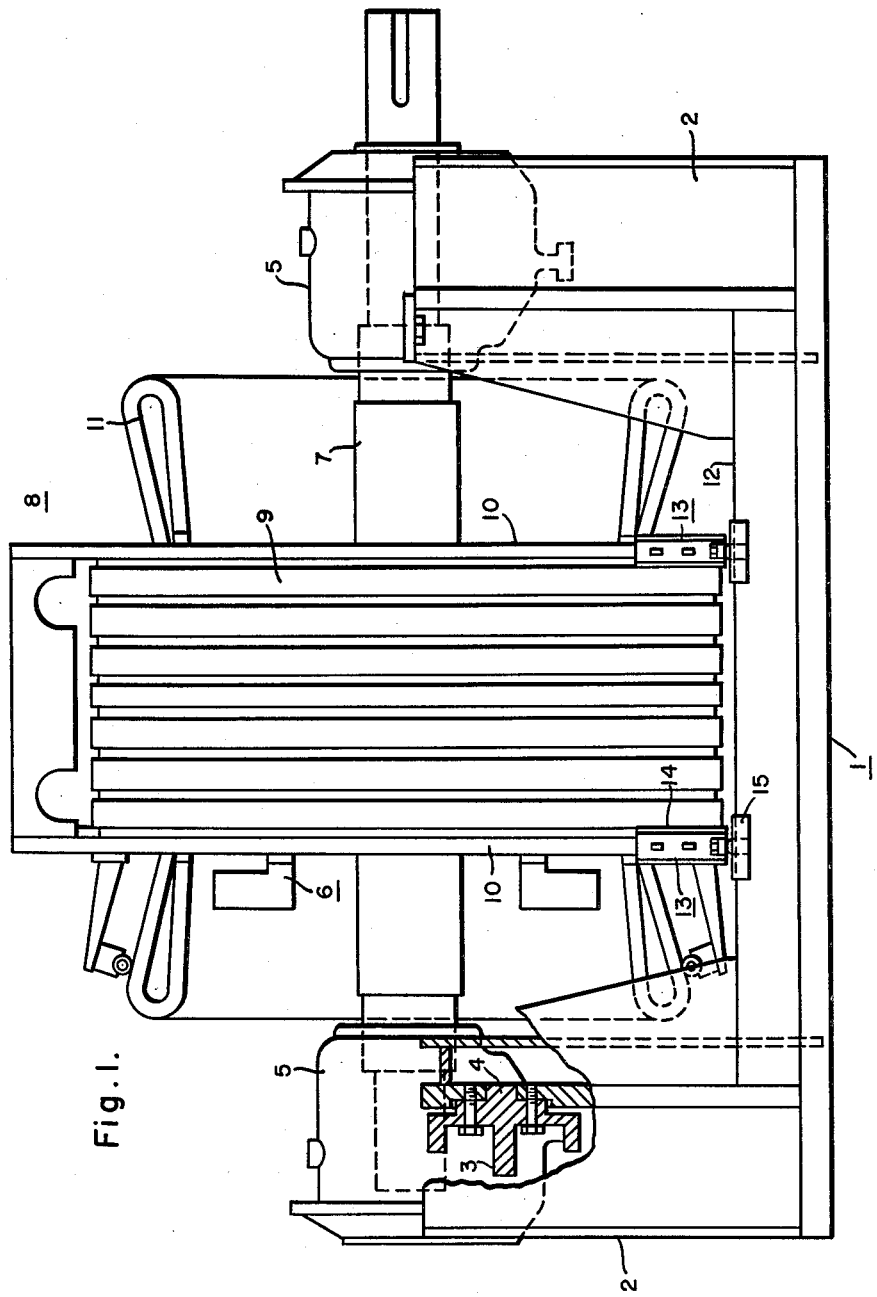

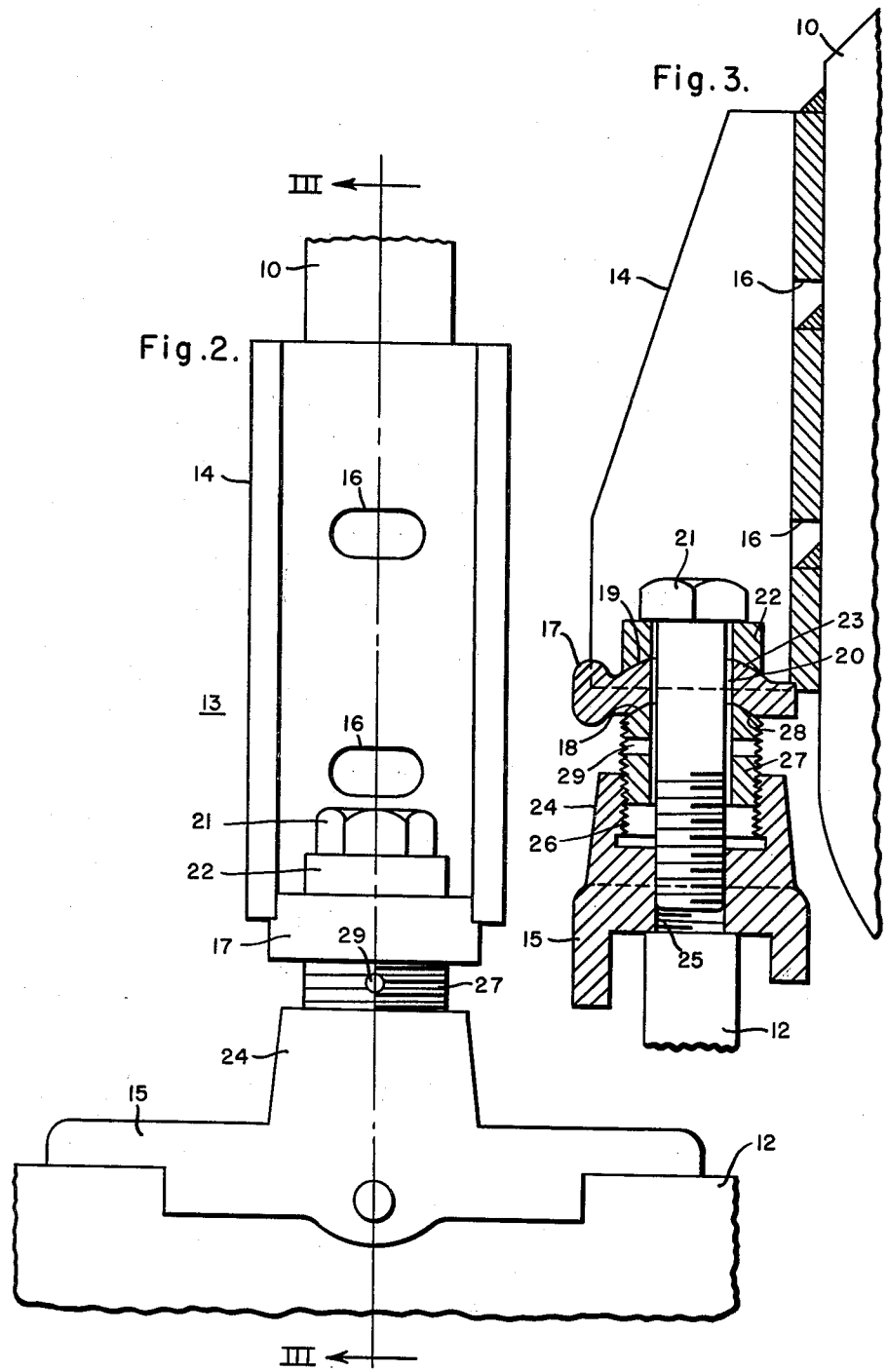

3,110,832
DYNAMOELECTRIC MACHINE
James C. Worthington, Jr., Monroeville, Frank H. Frantz, Wilkins Township, Allegheny County, and Alseno S. De Paul, Churchill, Pa., assignors to Westinghouse Electric Corporation, East Pittsburgh, Pa., a corporation of Pennsylvania
Filed July 22, 1959, Ser. No. 828,849
5 Claims. (Cl. 310—254)

The present invention relates to dynamoelectric machines, and more particularly to a dynamoelectric machine in which the stator and rotor members are supported independently on a rigid base and the stator member is secured to the base by separable securing means which permits easy removal of the stator member and accurately positions it in its predetermined location upon reassembly of the machine.

More specifically, the invention provides an improved construction for dynamoelectric machines of the type disclosed and claimed in a copending application of A. S. De Paul et al., Serial No. 731,707, filed April 29, 1958, now Patent No. 3,064,152, issued November 13, 1962. In machines of this type, the stator member and rotor member are supported independently of each other on a rigid base. The rotor member is supported in accurately aligned bearings carried on accurately positioned bearing supports at the ends of the base. In assembling the machine, the motor is placed within the stator member and supported in the bearings. The stator is adjusted to accurately align it with respect to the rotor and to obtain an accurately concentric air gap and the stator is then rigidly attached to the base. In this way a relatively simple type of construction is obtained which requires a minimum of expensive machining and in which the desired accuracy of alignment of the stator with respect to the rotor is readily obtained.

It is sometimes necessary or desirable to disassemble such a machine for maintenance or inspection, or other purposes, and the stator member must be secured to the base in such a manner that it can readily be removed and replaced. It is also necessary to replace the stator precisely in its previous position on the base so that the accurate alignment of the stator with respect to the rotor will be retained.

This has been done by the use of securing means of the type disclosed and claimed in a copending application of A. S. De Paul et al., Serial No. 738,796, filed May 29, 1958, now Patent No. 2,970,236, issued January 31, 1961. In this construction the stator member is secured to the base by means of separable securing means. Each of the securing means consists of an upper and a lower member held together by a clamping bolt and having engaging complementary spherical surfaces. After the stator member has been accurately adjusted in position with respect to the rotor, the securing members are put in position with the upper member of each engaging the stator and the lower member engaging the base. The upper members are then welded to the stator and the lower members to the base and the stator is rigidly secured to the base by tightening the clamping bolts. The stator can then readily be removed from the base by removing the clamping bolts and can be returned to its previous position without difficulty since the engaging spherical surfaces of the securing means precisely position the stator in its previous position, so that the accurate alignment of the stator with respect to the rotor is not lost upon disassembly and subsequent reassembly of the machine.

This construction has been satisfactory, in general, but in the initial assembly of the machine it has been found that when the securing members are welded to the stator and the base, the welding operation sometimes causes slight distortion or may result in slight relative movement of the stator with respect to the base. With the type of securing means just described, no further adjustment of the stator member is possible after the securing means have been welded in place, and if such slight distortions or relative movement should occur the accurate alignment of the stator would be somewhat impaired. Thus, it is desirable to make provision for some further adjustment after the securing means have been put in place.

The principal object of the present invention is to provide a dynamoelectric machine of the type described, in which the stator member is secured to a rigid base by separable securing and positioning means which are attached to the stator and the base after the stator has been accurately aligned with the rotor member, and in which provision is made for further adjustment of the position of the stator with respect to the base after the securing means have been attached to the stator and the base.

Another object of the invention is to provide a dynamoelectric machine in which the stator member is attached to a rigid base by separable securing and positioning means which has engaging spherical surfaces to accurately position the stator with respect to the base, and in which provision is made for adjusting the position of one of the spherical surfaces to permit adjustment of the stator member after the securing means have been fastened in place.

Other objects and advantages of the invention will be apparent from the following detailed description, taken in connection with the accompanying drawing, in which:

FIGURE 1 is a side elevation of a dynamoelectric machine embodying the invention, with the outer enclosing housing omitted;

FIG. 2 is a front elevation on an enlarged scale of one of the securing and positioning means; and FIG. 3 is a vertical sectional view substantially on the line III—III of FIG. 2.

The invention is shown in the drawing embodied in a dynamoelectric machine of the type disclosed in the copending application first above mentioned. Such a machine may be any type of dynamoelectric machine, either induction or synchronous, and, as shown in FIG. 1, such a machine has a rigid base member 1, which may be generally rectangular, and which has vertical uprights 2 at each end. Bearing supports 3 are mounted on the uprights 2 and are accurately positioned with respect to the base 1 by means of dowels 4, or other suitable means, for accurately locating the bearing supports in predetermined position with respect to the base. Bearings 5 are carried on the bearing supports and are accurately aligned with each other to support the rotor member in accurately predetermined position with respect to the base 1. The rotor member 6 may be of any suitable type, and is carried on a shaft 7 which is supported in the bearings 5. The stator member 8 includes a laminated stator core 9, of any suitable or usual construction, clamped between frame rings 10 at each end of the core to form a unitary structure. Stator windings 11 of any suitable type are placed in slots in the stator core 9 in the usual manner. The stator member 8 is supported on the base 1 independently of the rotor member, preferably on longitudinal bars 12 which extend from end to end of the base at each side.

In the assembly of a machine of this type, the bearing supports 3 and bearings 5 are first put in place on the base 1 with their positions accurately determined with respect to the base, as explained above. The rotor 6 is then assembled within the stator 8, and the rotor and stator together are placed on the base with the rotor shaft 7 supported in the bearings 5, thus accurately locating the rotor with respect to the base. The stator member 8 is free of the base at this time, and it is then adjusted in position relative to the base to accurately align the stator with the rotor and to obtain an accurately concentric air gap, by means of feeler gauges or other suitable means. After the stator member is thus accurately adjusted in position, it is rigidly attached to the base 1 by means of securing and positioning devices 13. An outer enclosing housing of any suitable type may then be mounted on the base, if desired.

As previously mentioned, it is frequently necessary or desirable to be able to completely disassemble the machine, for maintenance or repair purposes, and to be able to reassemble the machine without losing the accurate alignment of the stator with respect to the rotor. For this purpose, the securing devices 13 are of separable construction to make it possible to readily disengage the stator from the base, and they also serve to accurately locate or position the stator with respect to the base after it has once been adjusted in the initial assembly, so that the machine can readily be disassembled and reassembled with the stator precisely located in its original accurately adjusted position.

The securing and positioning devices 13 by which this result is obtained are shown in detail in FIGS. 2 and 3. Each of the securing and positioning devices 13 consists of an upper member 14 and a lower member 15. The upper member 14 is preferably made from a channel section, as shown, and is preferably provided with slots or openings 16 for welding it to the stator frame ring. The upper member 14 has a bottom piece 17 which may be integral with the channel section or which may be a separate member welded in place as shown in the drawing. The bottom piece 17 has a concave spherical surface 18 on its lower surface and has a convex spherical surface 19 on its upper surface, with a central opening 20 for passage of a clamping bolt 21. A washer 22 is also provided having a concave spherical lower surface, as indicated at 23, for engaging the spherical surface 19 of the member 17. The washer 22 has a flat upper surface on which the head of the clamping bolt 21 seats.

The lower member 15 of the securing device 13 may also be made of generally channel form, as shown in FIG. 3, and is made wide enough to permit some lateral movement with respect to the supporting bar 12 to enable the member 15 to be properly located. The lower member 15 has a central boss 24 and has a threaded opening 25 concentric with the boss for receiving the clamping bolt 21. The boss 24 has a relatively large central opening which is internally threaded, as indicated at 26, and a jack screw 27 is threaded into the boss 24. The jack screw 27 has a convex spherical surface 28 at its upper end for engaging the concave spherical surface 18 of the upper member 14, and has a central opening through which the clamping bolt 21 passes. The central openings of the washer 22, bottom member 17, and jack screw 27, through which the clamping bolt 21 passes, are made large enough to provide a substantial clearance between the clamping bolt and the respective members, as shown in FIG. 3.

In use, the securing devices 13 are assembled as shown in FIGS. 2 and 3 with the spherical upper surface 28 of the jack screw 27 engaging the complementary concave spherical surface 18 of the upper member 14. The clamping bolt 21 is threaded into the lower member 15 to hold the parts together in engaging relationship but is not initially tightened. After the stator member 8 has been adjusted in position with respect to the rotor, as previously described, the securing devices 13 are put in place as shown in FIG. 1, two securing devices on each side of the motor preferably being used. Each of the securing devices is placed with its lower member 15 resting on the bar 12 of the base 1 and with its upper member 14 engaging an adjacent frame ring 10 of the stator member. The two members 14 and 15 of the securing device are free to move angularly with respect to each other at this time, since the clamping bolt 21 has not been tightened and has sufficient clearance in the opening 20 to permit limited angular movement. The upper and lower members 14 and 15 are adjusted in position to properly engage the frame ring 10 and bar 12, respectively, and are then welded to the frame ring and the bar to permanently attach them thereto. The clamping bolt 21 may then be tightened to rigidly secure the stator member to the base in its adjusted position.

It has been found that the welding operation may cause slight distortion of some of the parts, or may cause slight relative movement of the stator with respect to the base, so that the accurate alignment and concentricity of the stator member are somewhat disturbed. The jack screws 27 are provided to permit sufficient adjustment to take care of such a condition and restore the desired accuracy of alignment. Thus, after the securing devices 13 have been welded in place and before the bolts 21 are tightened, the alignment of the stator and the concentricity of the air gap are again checked, and if further adjustment is found to be necessary, the jack screws 27 are utilized to perform such adjustment. Openings 29 may be provided in the jack screws for insertion of spanner wrenches or other suitable tools for turning the jack screws.

The provision of the four jack screws 27 makes it possible to readily readjust the stator 8 in any necessary manner. Thus, vertical adjustment is obtained by rotating all four jack screws an equal amount. Horizontal adjustment is obtained by turning the two jack screws on one side of the machine only, or by raising the jack screws on one side and lowering them on the other, while adjustment of diagonally opposite jack screws will permit any necessary skewing movement of the stator. After the final adjustment has thus been made, the clamping bolts 21 are tightened to rigidly secure the stator core to the base.

If it becomes necessary at any time to disassemble the machine, the stator can readily be removed merely by removing the clamping bolts 21, which permits the stator member to be lifted from the base. Upon reassembly of the machine, the four engaging spherical surfaces 18 and 28 of the upper members 14 of the securing devices and the jack screws 27 precisely locate and position the stator on the base in exactly the same position it occupied prior to its removal. Thus the machine can readily be disassembled and reassembled without losing the original accuracy of alignment of the stator with respect to the base. The jack screws 27 will normally not have to be moved after the original assembly and final adjustment, and may be locked in their adjusted positions by any suitable means if desired. If it becomes necessary at any later time, however, to realign the stator with respect to the rotor, such readjustment can readily be accomplished by means of the jack screws 27.

It should now be apparent that a dynamoelectric machine has been provided in which the stator member is accurately positioned with respect to the base by means of the new securing and positioning devices, and that these devices make possible a more accurate assembly of the machine than has previously been obtainable in machines of this type because of the provision of the jack screws which permit adjustment of the engaging spherical surfaces in the manner described.

A specific embodiment of the invention has been shown and described for the purpose of illustration but it will be obvious that various other modifications and embodiments are possible. Thus, if desired, the jack screw 27 might be threaded into the upper member 14 of the securing device and provided with a concave spherical surface at its lower end engaging a complementary fixed convex spherical surface on the lower member. Similarly, other modifications and embodiments are possible and are within the scope of the invention.

We claim as our invention:

1. A dynamoelectric machine having a base member, a rotor member supported on the base member, a stator member, and a plurality of securing and positioning means for attaching the stator member to the base member, each of said securing and positioning means comprising an upper member secured to the stator member, a lower member secured to the base member, said upper and lower members having spherical engaging surfaces adapted to accurately position the stator member with respect to the base member, jack screw means for adjusting the vertical position of the engaging surface of one of said upper and lower members, and means for rigidly clamping the upper and lower members together.

2. A dynamoelectric machine having a base member, a rotor member supported on the base member, a stator member, and a plurality of securing and positioning means for attaching the stator member to the base member, each of said securing and positioning means comprising an upper member secured to the stator member, a lower member secured to the base member, a concave spherical surface on the upper member, a convex spherical surface on the lower member, jack screw means for adjusting the vertical position of one of said spherical surfaces, said spherical surfaces engaging each other to accurately position the stator member with respect to the base member, and means for rigidly clamping the upper and lower members together.

3. A dynamoelectric machine having a base member, a rotor member supported on the base member, a stator member, and a plurality of securing and positioning means for attaching the stator member to the base member, each of said securing and positioning means comprising an upper member secured to the stator member, a lower member secured to the base member, a concave spherical surface on the upper member, a screw member threaded in the lower member for vertical adjustment with respect thereto, said screw member having a convex spherical surface thereon, said spherical surfaces engaging each other to accurately position the stator member with respect to the base member, and means for rigidly clamping the upper and lower members together.

4. A dynamoelectric machine having a base member, a rotor member supported on the base member, a stator member, and a plurality of securing and positioning means for attaching the stator member to the base member, each of said securing and positioning means comprising an upper member secured to the stator member, a lower member secured to the base member, a concave spherical surface on the upper member, a screw member threaded in the lower member for vertical adjustment with respect thereto, said screw member having a convex spherical surface thereon, said spherical surfaces engaging each other to accurately position the stator member with respect to the base member, a washer having a spherical surface engaging a corresponding spherical surface on the upper member, and clamping means engaging said washer and extending through the upper and lower members for clamping the upper and lower members rigidly together.

5. A dynamoelectric machine having a base member, a rotor member supported on the base member, a stator member, and a plurality of securing and positioning means for removably attaching the stator member to the base member in an accurately adjusted position with respect to the rotor member and the base member, each of said securing and positioning means comprising an upper member secured to the stator member and having a concave spherical lower surface, a lower member secured to the base member and having an internally threaded opening therein, a jack screw threaded in said opening, said jack screw having a convex spherical surface at its upper end and having a central opening therethrough, the spherical surfaces of the upper member and of the jack screw engaging each other to position the stator member with respect to the base member, and clamping bolt means passing through the upper member and the opening in the jack screw for rigidly clamping the upper and lower members together.

References Cited in the file of this patent
UNITED STATES PATENTS

| | | |
|---|---|---|
| 1,673,794 | Ayers | June 19, 1928 |
| 2,399,366 | Lynn | Apr. 30, 1946 |
| 2,970,236 | De Paul et al. | Jan. 31, 1961 |